Figure 1:
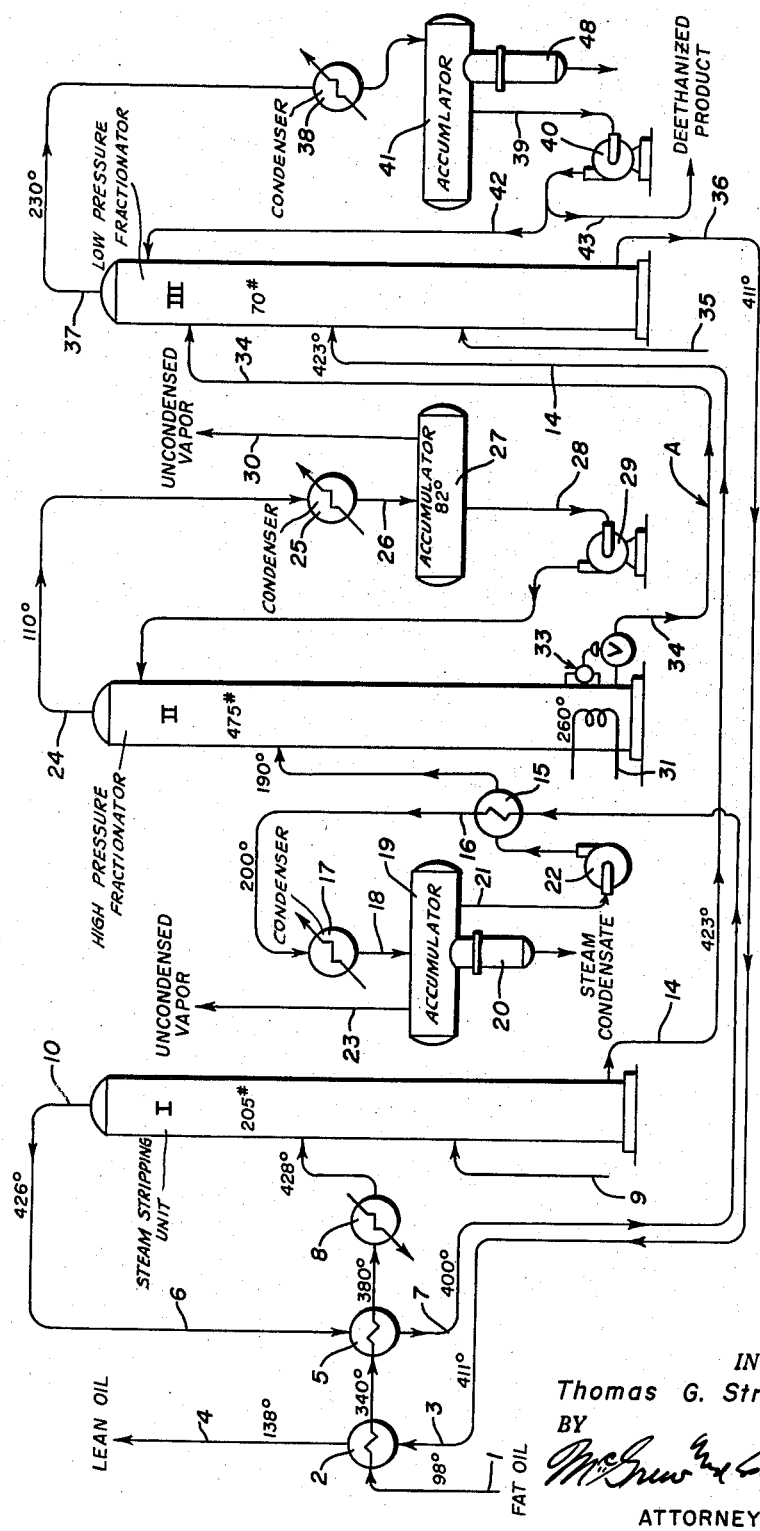

July 21, 1959 T. G. STRICKLAND 2,895,909
RECOVERY OF NATURAL GASOLINE BY FRACTIONATION
Filed Nov. 23, 1955 2 Sheets-Sheet 1

INVENTOR.
Thomas G. Strickland
BY
ATTORNEYS under Patent Office 2,895,909
Patented July 21, 1959

2,895,909

RECOVERY OF NATURAL GASOLINE BY FRACTIONATION

Thomas G. Strickland, Denver, Colo., assignor to The Stearns-Roger Manufacturing Company, Denver, Colo., a corporation of Colorado Application November 23, 1955, Serial No. 548,747

2 Claims. (Cl. 208—364)

This invention relates to improvement in a natural gasoline absorption plant wherein light hydrocarbon fractions of the natural gasoline are removed from the natural gasoline and partially separated from subsequent treatment.

Due to an increase in demand for propane, most of the natural gasoline plants built in the last decade have a requirement of a high recovery of propane from natural gasoline, the recovery usually ranging from about 60 percent to 90 percent or more. Such high recoveries of propane call for a high rate of absorber oil circulation. The high oil circulation rate combined with the fact that most modern gasoline plants operate at high absorption pressures results in the absorption of relatively large volumes of fixed hydrocarbon gases, that is low molecular weight aliphatic hydrocarbons such as methane and ethane, along with the propane and heavier hydrocarbon compounds. To efficiently recover the absorbed propane and heavier components from a stream of fat oil, that is, absorber oil rich in the fixed gases, and propane and heavier hydrocarbon components, it is first necessary to remove the two fixed gases from the oil. One conventional scheme for such separation is to pass the entire fat oil stream through one or more weathering stages, comprising weathering or vent tanks operated at pressures lower than the pressure of the original absorption, and then recovering from the weathered gases the small amount of propane and heavier hydrocarbon components. This recovery may be accomplished by passing the weathered gases through auxiliary absorbers operating at a still lower pressure. After the stream of fat oil has passed through the weathering stages it usually still contains enough of the fixed gases to require their elimination before going to the normal system of distillation and fractionation of the products distilled from the oil stream.

One method by which the fixed gases have been eliminated from the oil stream is by the use of a so-called "fat oil fractionator" or "deethanizer." The deethanizer is a fractionating column in which previously heated fat oil is passed over the lower plates. The upper plates of the column, that is, above the point of entry of the preheated fat oil, are supplied with reflux liquid to control the composition of the gases finally leaving the top of the column. This reflux may be derived by partially condensing the vapors from the fractionator or by introducing a stream of lean absorber oil taken from the main lean oil stream of the gasoline plant. It is necessary to supply heat to the fractionating or stripping column. For this purpose, a reboiler or its equivalent in the base of the column generates stripping vapors which pass up through the plates in the lower part of the column and strip from the fat oil essentially all traces of ethane and methane.

In order to insure effective stripping of these components from the fat oil stream, it is necessary to reboil a considerable volume of hydrocarbon materials heavier than ethane, which hydrocarbon materials must then be recaptured by absorption in the reflux in the upper plates of the column. This reboiling requires a large heat input into the column at a temperature level of about 300° F., and normally between 300° and 400° F. In order to hold back the required amount of propane and heavier hydrocarbon components by re-absorption in the reflux an equivalent amount of reboiler heat must be dissipated through a relatively low level cooling of the vapors leaving the column.

The present invention provides a method of eliminating a substantial part of the reboiler heat required by the fat oil fractionator system, and consequently the elimination of a large part of the cooling required for the reflux of the deethanizer. The present invention, therefore, provides some important economies in the consumption of heat for effecting separation and fractionation of absorbed materials from a stream of saturated oil from the main absorbers of the natural gasoline plant.

Included among the objects and advantages of the present invention is to provide a system in which noncondensable gases are separated from propane and heavier hydrocarbon constituents. The invention, also, includes a system for effecting a separation of absorbed materials from a stream of fat oil substantially without the use of a reboiler system in the separation of propane and heavier hydrocarbon materials from methane and ethane. The method of the present invention includes a system of eliminating a substantial part of reboiler heat required in the fractionating of fixed hydrocarbon gases from propane and heavier hydrocarbon components as well as the elimination of a large part of the cooling requirements for the reflux of the fractionator making such a separation.

Figure 2:
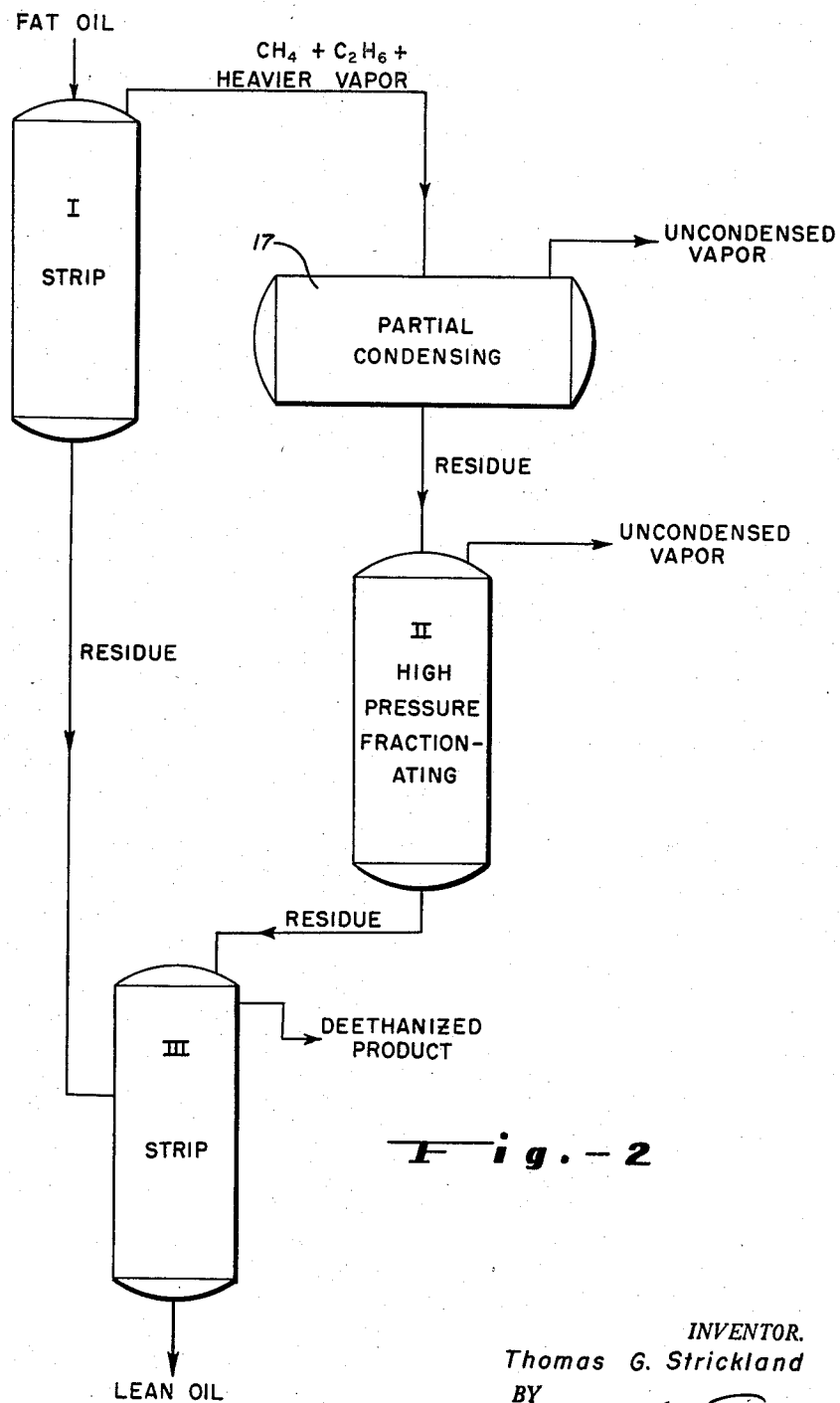

These and other objects and advantages of the invention may be readily ascertained by referring to the following description and illustrations in which:

Fig. 1 is a diagrammatic system according to the invention for separating fixed gases from propane and heavier hydrocarbon gases from the carrier oil in which they are absorbed; and Fig. 2 is a schematic view of the major steps of the method of the invention.

The exact operating conditions for the various steps of a natural gasoline plant, must, obviously, vary with the particular installation. The conditions of temperature and pressure indicated in the flow sheet of Fig. 1 are illustrative only, since the design conditions vary with the operating pressure of the main absorbers, the composition of the gas, and the degree of desired propane recovery. In one particular system, for example, with a gasoline plant operating at 900 p.s.i.g. (pounds per square inch gauge) in the primary absorbers, the pressures in successive weathering stages may be 450 p.s.i.g., followed by about 300 p.s.i.g. The optimum pressures to vent as much of the fixed gases as possible without requiring excessive amounts of absorber oil in the secondary absorbers for the desired recovery of propane and heavier hydrocarbon components must be calculated for each particular case.

The flow sheet of Fig. 1 illustrates a general system, and for the specific installation the temperatures and pressures in the various steps are utilized for the illustration of the method of the invention only and not as a limitation on the system itself. The fractionators may be of any standard design well known in the art, and the auxiliary equipment, such as condensers, heat exchangers, accumulators, etc., may also be any of the known equipment used in the petroleum industry.

A stream of fat oil, which has been through conventional stages of weathering at pressures lower than the primary absorption pressure, enters the system by pipe 1, at about 98° F. The oil passes through a heat exchanger 2, which is heated by means of stripped lean oil in line 3 from the final stripping in the system. The lean oil leaves the heat exchanger 2 through pipe 4 and it is subsequently returned into the absorber system (not shown). The heated fat oil passes from heat exchanger 2 at about 340° F. to another heat exchanger 5 where it is heated to about 380° F. by means of the vapor coming from a first fractionator I in the system. The vapor from this fractionator is introduced into the heat exchanger 5 by means of a pipe 6, and the resultant cooled and partially condensed vapor then passes through pipe 7 into an accumulator 19, as described subsequently. The fat oil leaving the heat exchanger 5 passes through a third heat exchanger 8 where its temperature is raised to about 428° F. The heat exchanger 8 utilizes an external source of heat, usually direct firing, in order to heat the fat oil to this temperature.

Heated fat oil from heat exchanger 8 is fed into fractionating column I at about the midpoint of the column. The fixed gases ethane and methane are substantially removed from the fat oil stream by admission of stripping steam introduced into the bottom of the column through a steam line 9. As this steam passes up through the column, counterflow to the oil stream, it removes substantially all traces of methane and ethane, but also carries with it considerable amounts of propane and heavier hydrocarbon fractions. The vapors and gases leave the top of the fractionator I through vapor outlet 10. The partially stripped oil, containing a substantial portion of the propane and heavier hydrocarbon components, leaves the fractionator I through pipe 14 at a temperature of about 423° F. It passes into a fractionator III at about its midpoint.

The condition required of the stripping still or fractionator I is that vapor leaving it shall contain substantially all of the methane and ethane contained in the entering fat oil, so that the fat oil leaving its base will contain none of ethane or methane. Along with the ethane and methane which passes as vapor from the still is a considerable amount of propane and heavier hydrocarbons. This vapor contains, also, some of the lighter fractions of the absorber oil. It is obviously necessary to fractionate this mixed stream of vapor leaving the top of the fractionator I so as to separate all the methane and ethane gas and at the same time retain substantially all of the propane and heavier hydrocarbons in the vapor stream. This fractionation is effected as follows:

The mixed vapor leaving the stripper I first passes through the heat exchanger 5 where it is cooled to about 400° F. The partially cooled vapors leaving heat exchanger 5 are passed through another heat exchanger 15, which cools them to about 200° F., while heating the feed of the deethanizer or fractionator II.

The vapor from exchanger 15 passes to condenser 17, where its temperature is lowered further to about 82° F. The cooling of the vapor by the exchangers 5 and 15, and the condenser 17, condenses most of the stripping steam and a substantial part of the hydrocarbon vapors leaving column I. The mixed liquid-vapor stream then passes through line 18 into an accumulator 19 where the water which has condensed from the stripping stream is separated and discharged through a condensate trap 20, and the liquid hydrocarbons are withdrawn through pipe 21.

The liquid hydrocarbons pass through pump 22 and exchanger 15 into the fractionator or deethanizer II. The fixed gases and non-condensed vapor pass out of the accumulator through pipe 23 to a secondary vapor recovery system, not shown, for recovery of the desirable fractions. Column II operates at about 475 pounds per square inch gauge. The feed is heated to about 190° F., by heat exchanger 15, and is introduced into about the middle of the column. The column is operated in the usual way as a fractionator, using as reflux liquid obtained by partial condensation of the overhead vapors, and reboiling at the base by application of heat from an external source.

Vapor leaves the column at about 110° F., and passes to a condenser 25 where it is cooled to about 82° F., with partial condensation. The mixture of liquid and vapor from the condenser 25 passes through pipe 26 into an accumulator 27 where separated liquid hydrocarbon passes out through pipe 28, through pump 29, and back into the top of the column as reflux. The non-condensable vapor passes from accumulator 27 through line 30 to the secondary vapor recovery system.

The heat input at the base of the column through heater 31 and the amount of reflux delivered to the top of the column are adjusted to completely strip all methane and ethane from the entering feed. Heat is introduced into the bottom of column II through heating coil 31 sufficient to maintain there a temperature of about 260° F.

The bottom product from column II passes through a level control system 33, through line 34 into the upper portion of stripping column III. This product from column II serves partially as reflux for the hotter and heavier hydrocarbons entering column III from the bottom of column I, and it also delivers into the still all of the usable hydorcarbons originally stripped from the fat oil in still I.

The partially stripped fat oil, which is the bottom product of column I passes at a temperature of about 423° F. through line 14 into the column III at a point about halfway up the column. Another stream of feed enters column III through pipe 34 which carries the bottom product from the deethanizer II. Since the hydrocarbons in this stream are lighter than those in the pipe 14, and are also at a lower temperature, this feed is introduced at a point somewhere between the middle and top of column III. These two feeds entering column III contain all of the materials originally absorbed in the high pressure absorbers with the exception of the methane and ethane stripped from the fat oil stream by column I, and the small amounts of propane and butane unavoidably lost in the secondary recovery system from the uncondensed vapors leaving columns I and II.

The completely stripped lean oil residue leaves the bottom of column III through line 36 at a temperature of about 400° F. and it is used as the heating medium in the heat exchanger 2, which initially heats the fat oil entering the system. The combined propane and heavier hydrocarbon vapors and the stripping steam pass from column III through vapor outlet 37 at a temperature of about 230 degrees. The vapors then pass into a condenser 38, which totally condenses all of the materials. This mixed condensate passes into accumulator 41. The water from the stripping steam is trapped and discharged through water trap 48, and the separated liquid hydrocarbon is discharged through pipe 39 into pump 40. A portion of the stream from pump 40 passes along line 42 for reflux into the top of column III, and the remaining portion passes through pipe 43 as the final deethanized product.

The reflux passing into column III absorbs all the light components of the absorption oil which would otherwise pass out the top of the still along with the vaporized hydrocarbons. The deethanized product, which is a mixed hydrocarbon material of propane and heavier hydrocarbons, passes out of the system to such further fractionation as may be required. The stripping steam admitted to the base of the column is adjusted so as to completely remove all of the absorbed hydrocarbons from the absorber oil, and the reflux over the top of the column is adjusted so as to retain within the column all the fractions of the absorber oil itself, which is subsequently removed through the bottom product outlet 36 back into the primary absorber system.

Where the original raw gas may contain unusual amounts of propane, or where an unusually high recovery of propane is desired, it may be economical to insert at point A, on the bottom product outlet from column II, a depropanizer or fractionator whose sole function is to remove from the stream considerable amounts of propane. The advantage gained by such a column is to reduce the relative amount of propane which is fed into column III. By removing the propane, column III may be operated at a lower pressure and still secure total condensation of its overhead vapors. The lower pressure of the still, also, makes it possible to strip the lean oil with smaller amounts of steam which obviously reduces the requirements of both the steam in fractionator and the cooling facilities of the condenser 38.

The general system is schematically illustrated in Fig. 2 wherein fat oil enters the stripping column I, and the vapor from the stripping column passes to a partial condenser 17. The vapor stripped from the fat oil in column I includes methane, ethane and heavier hydrocarbon fractions, while the vapor exhausting from the partial condenser 17 is substantially all fixed or uncondensed gases, that is, methane and ethane. The residue from the partial condenser passes into a high-pressure fractionator II which removes the final fraction of the methane and ethane from the original fat oil. The residue from the high pressure fractionator II and the residue from column I passes into a stripping column III, which substantially removes all the originally absorbed propane and heavier hydrocarbon fractions. The lean oil leaving column III is substantially free from such hydrocarbon gases. Since residue from columns I and II contains no methane or ethane, all the absorbed propane and heavier hydrocarbons are recovered as product from column III.

While the invention has been described by reference to a specific embodiment there is no intent to limit the invention to the precise details of the system as illustrated except insofar as set forth in the following claims.

I claim:

1. In a process for the separation of a mixture of hydrocarbons absorbed in an absorber oil, the steps of initially high-pressure steam stripping such a mixture in the absorber oil at a sufficiently high temperature to produce a first overhead fraction containing substantially all light, undesirable components with a major portion of the desirable components and a bottom fraction containing the remainder of the desirable components, partially condensing said initial overhead fraction to liquefy substantially all the desirable components therein and to separate fixed gases therefrom, passing said last mentioned liquified fraction to high-pressure fractionation to substantially completely separate the light undesirable fraction from the desired components, passing the bottom product from said high-pressure steam stripping step to low-pressure fractionation to remove substantially all the desired fraction from said partially stripped absorber oil, and passing the bottom product from said high pressure fractionation as supplementary reflux into said low-pressure fractionation whereby the heat of the lower boiling components is utilized as a source of heat in said low-pressure fractionation.

2. The method of claim 1 for the recovery of propane and higher hydrocarbons in which the mixture in the absorber oil enters the steam stripping step at about 428° F., the first overhead fraction leaves the steam stripping zone at about 426° F., the bottom fraction leaves the steam stripping step at about 423° F., the first overhead fraction enters the partial condensing step at about 200° F. the liquid condensate enters the high pressure fractionation at about 190° F., the bottom product from said high pressure steam-stripping step enters the low temperature fractionation at about 423° F., and the bottom product from the high pressure fractionation leaves the latter at a temperature of about 260° F.

References Cited in the file of this patent
UNITED STATES PATENTS

| | | |
|---|---|---|
| 2,256,405 | McMillan | Sept. 16, 1941 |
| 2,327,896 | Houghland | Aug. 24, 1943 |